United States Patent Office.

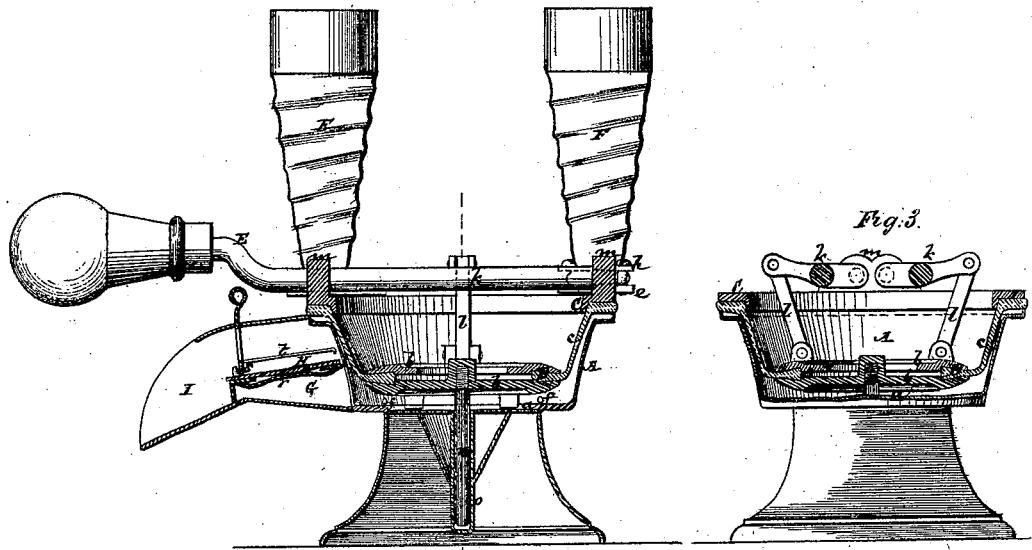
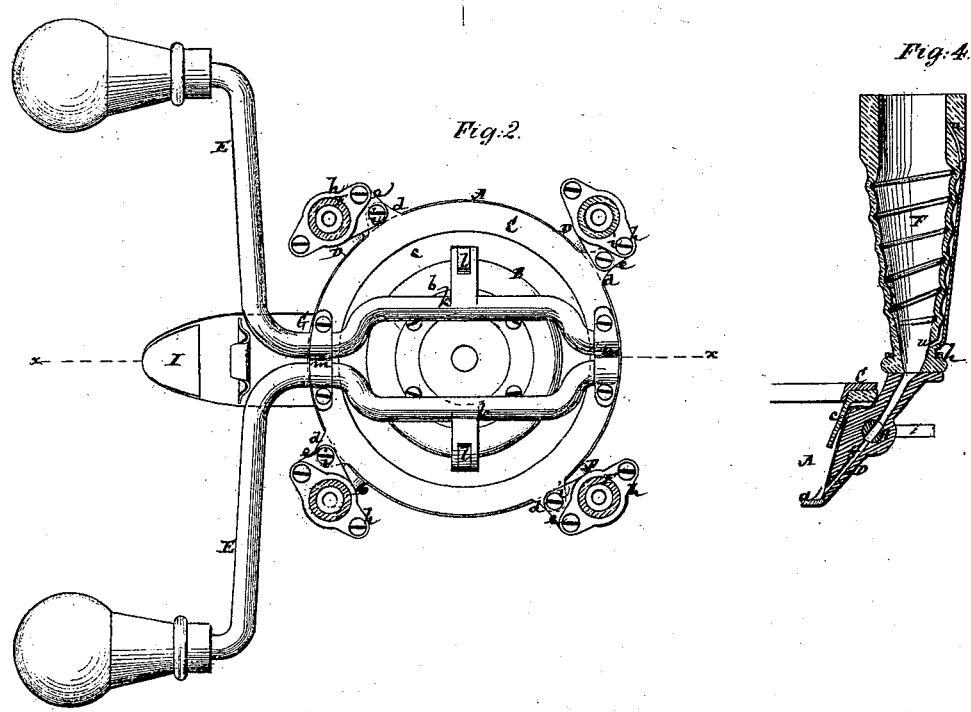

LEIGHTON O. COLVIN, OF HUMPHREYVILLE, PENNSYLVANIA.

Letters Patent No. 108,881, dated November 1, 1870.

IMPROVEMENT IN COW-MILKERS.

The Schedule referred to in these Letters Patent and making part of the same.

*To all whom it may concern:*

Be it known that I, LEIGHTON O. COLVIN, of Humphreyville, in the county of Luzerne and State of Pennsylvania, have invented a new and useful Improvement in Cow-Milkers, of which the following is a full, clear, and exact description, reference being had to the accompanying drawing forming part of this specification, and in which—

Figure 1 represents a sectional elevation of a cow-milker constructed in accordance with my improvement, said section being taken as indicated by the line $x$ $x$ in Figure 2, which is a sectional plan of said milker;

Figure 3 is a vertical section at right angles to fig. 1 of the pan and working portions of the milker, with teat-cups removed; and Figure 4, a vertical section of one of the teat-cups as combined with the pan, which latter is shown only in part.

Similar letters of reference indicate corresponding parts.

This invention is mainly designed to be applied to cow-milkers of a portable character, intended to be operated by hand on one cow at a time, and has certain features in common with the cow-milkers described in Letters Patent issued to me February 17, 1863, and April 5, 1870, such as, for instance, a piston with flexible margin attached to the upper edge of the pan, and serving to work a series of teat-cups; likewise a certain arrangement of the handles of the apparatus, whereby they are made to serve the two-fold purpose of operating and carrying it in such manner that, in the working of said handles, swing or twist on the teats is avoided, and so that a straight up-and-down motion is communicated to the apparatus corresponding to the natural sucking action or motion of the calf. It also includes, as previously used, a separate valve or cock to each teat-cup, for establishing or shutting off communication of any one or more of the cups with the pan below the piston, to facilitate the separate attachment of the teats to the apparatus and for other purposes.

This invention, however, essentially differs from previous machines in several important particulars. Thus, it dispenses with the use of water for working the teat-cups, and secures relief to the teats by establishing flow of the milk up and down and within the teat-cups, without risk of the milk being expelled over the tops of the latter.

The invention also embraces a certain combination of handles arranged to operate as hereinbefore described, and cranks and rods operated by said handles, with a flexible diaphragm or piston, steadied in its travel by a lower stem or guide-rod, whereby a smooth, steady, and perfect action of the apparatus is secured and wear of parts reduced.

The invention likewise includes an elevated arrangement of the discharge-valve relatively to the base of the pan, whereby the machine is always kept charged and said valve covered with milk, such valve preferably being of a flexible-flap construction and made to rest on or close against a perforated sheet-metal plate.

The invention furthermore embraces certain peculiarities of construction to stiffen the apparatus and facilitate the removal of parts; also, includes an air-passage up the side of the teat-cups, to prevent the teats being drawn down or wedged in said cups.

Referring to the accompanying drawing—

A represents the pan of the apparatus, which pan may be made of sheet metal, and operates as a pump cylinder, $a$ being the base thereof.

B is the elastic diaphragm or piston, formed of plates $b$ $b$, holding between them a rubber or other suitable flexible strip, $c$, which is secured on its outer edge to the top of the pan by a clamping-ring, C, provided with ears $d$ that are made to lock under lugs $e$, arranged to project from brackets D run up the sides of the pan. These brackets D serve materially to stiffen the pan, and have the suction-passages $f$ to the teat-cups F up through them, said passages being of a small-sized area, and communicating with the pumping-chamber of the pan at or near its base $a$.

Said brackets D also serve to carry the cocks $g$, which are used to shut off communication with the teat-cups when required, said teat-cups being secured by clamps and screws $h$ to the tops of the brackets, that have screws $i$ fitted through their lugs $e$, for tightening down the clamping-ring C on the flexible portion $c$ of the piston. Thus the brackets D have a multiplicity of functions or uses.

E E are the reversely-cranked handles, by which the machine is carried and operated as hereinbefore referred to, but instead of using toothed sectors and racks for communicating motion from said handles to the piston, as in my patent of April 5, 1870, I attach levers to or crank the shafts of said handles, as at $k$ $k$, and connect such lever portions, by rods $l$ $l$, with the top plate of the moving diaphragm or piston, the shafts of the handles working in bearings $m$ $m$, on the ring C. This constitutes a simple, efficient, and durable means for working the piston, and, by the clamping-ring C being secured in a readily-detachable manner by its ears $d$, arranged to pass under the lugs $e$, the whole working mechanism, together with the piston, can be removed from the pan, when necessary to clean the latter, or for other reasons, by simply turning the ring C to pass from under lock of the lugs $e$.

Secured to the bottom of the diaphragm or piston is a stem, $n$, made to work in a tubular guide, $o$, arranged to project below the base-plate $a$ of the pan, and closed at its lower end. This constitutes a steadying device to the working mechanism, and serves to prevent shake and wear of the diaphragm, also to give steadiness generally to the apparatus.

G is an outlet-passage or chamber arranged to project from the one side of the lower portion of the pan or working-chamber thereof. This passage G is covered by a perforated plate, *r*, of sufficient area as regards its perforations to allow of free egress through it for the milk from the pan upon a flap-valve, H, which covers said plate, being raised. The discharge-valve H is thus made to occupy an elevated position relatively to the base of the pan, which insures the machine always being charged with milk, and, by means of a dam, *s*, at the outer end of the valve, the latter is kept covered with milk passing to the spout I, which insures the tightness of said valve.

The perforated plate *r* serves to support the valve H. This valve may be made of any soft material, and is restrained from unduly rising by a tongue, *t*.

In the operation of the machine the suction to draw the milk from the teats is produced by the ascent of the piston or diaphragm, and each descent of the latter forces back a portion of milk up the contracted passages *f*, but not with sufficient force to expel it over the tops of the teat-cups, and it is only toward the completion of the down stroke of the diaphragm that the valve H is lifted, and milk discharged through the perforated plate *r*. In this way the teat-cups are kept supplied with milk, the lower ends of the passages *f* being always under cover of the milk, and relief is given to the teats in the working of the apparatus by the back flow of the milk preventing the air from entering to give relief, and without the use of water outside of the cups.

The teat-cups F have an air-passage, *u*, in their sides extending from their upper to their lower portions, and opening at its two extremities within the cups. This, by establishing equalization of the vacuum above and below, prevents the teats from being drawn down or wedged within the cups.

What is here claimed, and desired to be secured by Letters Patent, is—

1. The reversely-cranked handles E E, cranks or levers *k k*, and rods *l l*, all constructed and arranged for operation substantially as described, in combination with the flexible diaphragm B, provided with a lower guiding-stem, *n*, essentially as set forth.

2. The arrangement, essentially as herein set forth, of the discharge-valve H, relatively to the base of the pan and contracted suction-passages *f* leading to the teat-cups, substantially as and for the purpose specified.

3. The outlet-chamber G, provided with a perforated discharge-plate, *r*, and dam *s*, in combination with the valve H, the whole being arranged in relation to the pan, as specified.

4. The clamping-ring C, provided with locking-ears *d*, for action under fixed lugs *e*, in combination with the reversely-cranked handles E E and flexible diaphragm or piston B, substantially as described.

5. The air-passage *u* within the sides of the teat-cups, arranged to communicate at its opposite ends with the interior of the latter, substantially as and for the purpose herein set forth.

L. O. COLVIN.

Witnesses:
FRED. HAYNES,
R. E. RABEAU.